Jan. 9, 1934.  W. PAULUS  1,942,661
WINDSHIELD CLEANER ARM
Filed May 25, 1931
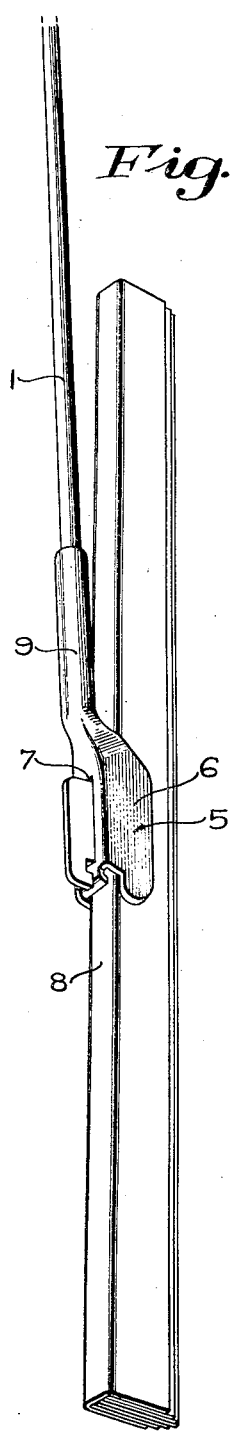
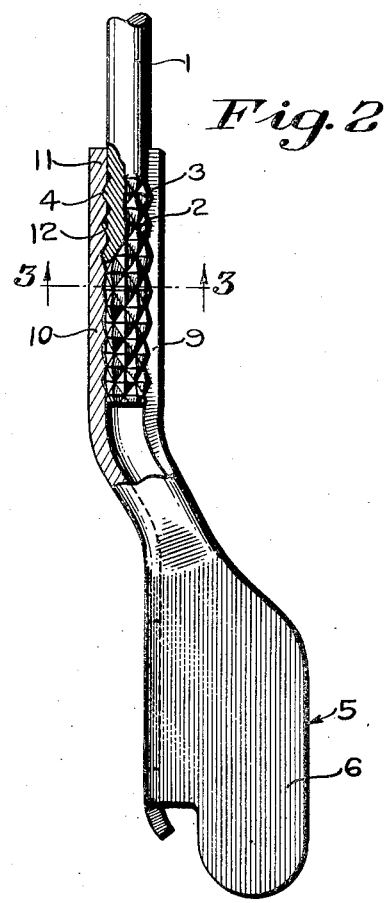
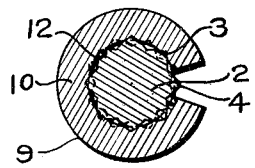
Inventor
William Paulus
By Bean Brooks & Henry.
Attorney Patented Jan. 9, 1934

1,942,661

UNITED STATES PATENT OFFICE

1,942,661

WINDSHIELD CLEANER ARM

William Paulus, Buffalo, N. Y., assignor to Trico Products Corporation, Buffalo, N. Y.

Application May 25, 1931, Serial No. 539,914

1 Claim. (Cl. 287—109)

This invention relates to windshield wiper arms and has particular reference to its construction and also to the method of producing the same.

Heretofore, wiper arms have been provided in which the connection between the free end of the arm and the wiper blade has necessitated the provision of a sheet metal saddle carried by the arm for straddling the blade. The major portion of the arm is preferably formed of a length of rod or wire, and various forms of connections between the free end of the rod and its sheet metal saddle have heretofore been devised, but such methods of joining have been objectionable in that the sheet metal portion has required certain deformation and hence detracts from the beauty and finish of the complete embodiment.

The object of the present invention is to provide a novel joint or connection in the wiper arm construction by which the parts are effectively secured together without any outward deformation which might detract from the finish or appearance of the arm.

These and other objects and advantages may become apparent from the following description of one typical embodiment of the invention described in the following specification with reference to the accompanying drawing, wherein:

One embodiment of the wiper arm and connection is described in the following detailed description wherein reference is made to the accompanying drawing, in which:

Fig. 1 is a fragmentary perspective view of an arm constructed in accordance with the present invention, and having a modern type of wiper blade attached thereto.

Fig. 2 is an enlarged fragmentary side elevational view with a portion broken away to show the interengagement of the knurling with the sleeve.

Fig. 3 is an enlarged transverse sectional view taken on line 3—3 of Fig. 2.

Proceeding in accordance with the present invention a rod part is firmly embraced by a sleeve part and a plurality of projections on one of the parts are embedded in the other part to effect a permanent interlock between the parts.

In practice the elongated rod 1 is provided with a knurled portion 2 on one terminal thereof. The knurling is of the cross type wherein the ridges of one knurl are intersected by those of the other knurl to provide a plurality of radially extending projections or pyramid-like points 3. The apices 4 of points 3 preferably extend beyond the surface of rod 1 and the bases of adjacent points preferably lie in a circular plane below the surface of said rod, for a purpose to be hereinafter described.

In forming knurled portion 2 metal is forced from the body of rod 1 to form points 3. This working of the metal produces points which are harder and stronger than the original rod.

A wiper-blade carrying member 5 having a pair of spaced ears 6 and a slot 7 for mounting the wiper blade 8 is preferably formed with a split-sleeve 9 of greater length than knurled portion 2. As shown in Fig. 2 the longer or major portion 10 of sleeve 9 embraces knurled portion 2, and the shorter or minor portion 11 of sleeve 9 embraces rod 1 immediately adjacent knurled portion 2. In the embracing relation of sleeve 9 on rod 1 the points 3 interengage with impressions or recesses 12 formed in the inner wall of major portion 10 to a depth approximately one-half of the points.

The minor portion 11 serves to gauge the depth to which the points may be embedded in the major portion of the sleeve during the attachment of the sleeve to the rod, and further assists in maintaining the sleeve upon the rod when the parts are assembled. During the attachment of the sleeve to the arm the inner surface of the sleeve is upset by the points being embedded therein, to provide the interengagement of the parts. The spaces between the points are so formed that the upset metal forced thereinto never completely fills the spaces.

The knurled portion 2 of rod 1 is obtained as by rolling one terminal of the rod between a pair of knurling dies.

The wiper carrying member 5 may be formed in any suitable shape as by stamping, and is preferably formed of metal somewhat softer than the hardened points 3. After the split-sleeve is positioned about the knurled portion with the minor portion lying therebeyond, pressure is applied upon the sleeve to close it firmly and tightly about the knurled portion whereby the hardened points are pressed or embedded in the inner surface of the major portion of the sleeve and a permanent interlocking joint results. The interengagement of the points with the sleeve successfully resists lateral separation or relative rotation of the parts without any additional connecting media.

What is claimed is:

In a sectional windshield wiper arm, a rod having a knurled portion at one terminal thereof, said knurled portion constituting a plurality of pyramid-like points directed substantially radially of the rod to a greater distance from the axis of the rod than the unknurled surface of the rod, the bases of the pyramid-like points being disposed a lesser distance from the axis of the rod than the unknurled portions thereof, and a wiper blade carrying member of sheet metal formed with a split sleeve at one end portion, said sleeve embracing and being pressed about said knurled portion and said points projecting through the inner surface of the split sleeve, an end portion of the sleeve fitting about the rod immediately adjacent the knurled portion to determine the projecting depth of the points into the inner surface of the sleeve.

WILLIAM PAULUS.